Oct. 21, 1930.  J. F. RUSSELL  1,779,189
TOOL HOLDER
Filed Nov. 14, 1927
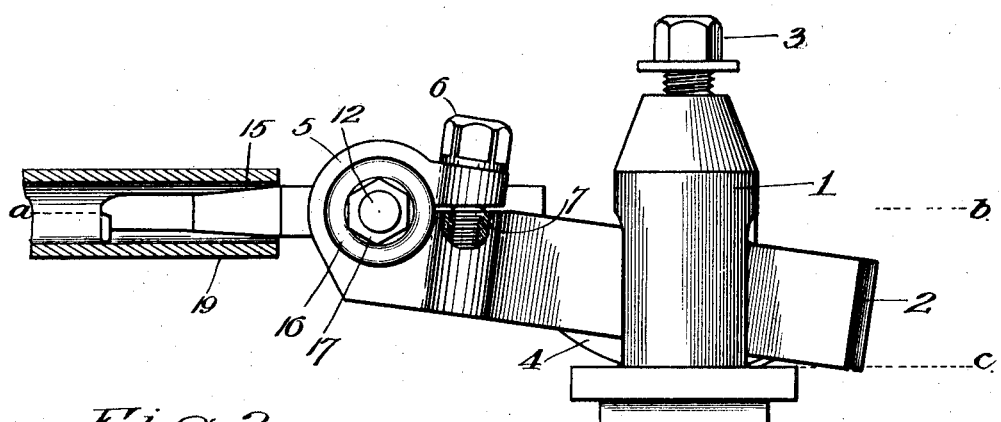
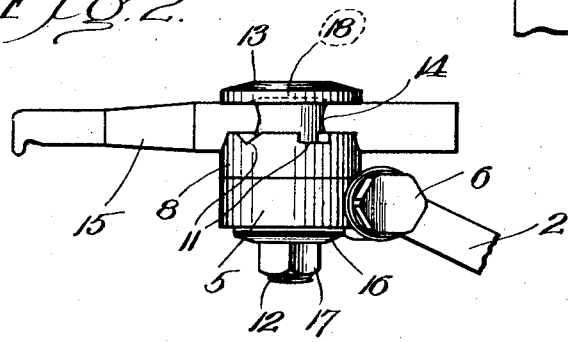
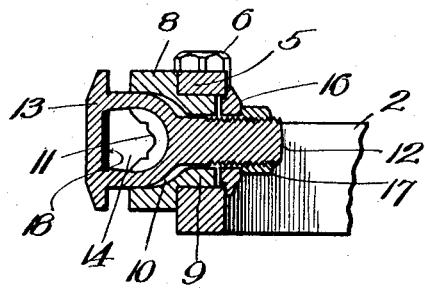
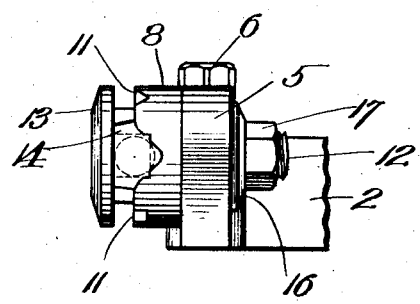
INVENTOR
John F. Russell.
BY
Thorpe & Thorpe ATTORNEY Patented Oct. 21, 1930

1,779,189

UNITED STATES PATENT OFFICE

JOHN F. RUSSELL, OF KANSAS CITY, MISSOURI

TOOL HOLDER

Application filed November 14, 1927. Serial No. 233,063.

This invention relates to lathe tool holders for adjustably holding tools or cutters. The distance between the horizontal planes of the axis of the head stock and the tool-support base of the tool post, varies in different lathes, and heretofore there has been no tool holder available susceptible of use on any tool post and adjustable to hold its tool with its axis in the same horizontal plane as that of the head stock, as very desirable and as even necessary in boring small holes of considerable length.

If the distance referred to is great enough, the tool holder can be raised by the use of blocks or shims to provide for the proper support of the tool, but if the distance is too little, it is impossible, with the conventional tool holder, to properly adjust or aline the tool for its full length with the work.

The prime object of my invention therefore is to provide a holder susceptible of use with any conventional lathe, and by which the tool can be adjusted to lie for its full length, in the horizontal plane of the axis of the head stock. All tool holders with which I am familiar, have the tool seat or groove facing upward and hence if the holder is adjusted upward or downward by the tool post rocker, the longitudinal center or axis of the tool assumes a corresponding angle. If the tool either when horizontal or sloping upward or downward is operating in a hole or recess of sufficient diameter to permit of its penetration to the required depth without conflict with the wall of the boring at any point of its shank, the boring operation can be performed, but if the angle is such that, as the penetration proceeds, the shank of the tool at some point must contact with the inner wall of the bore, it is apparent that the depth of the boring is correspondingly limited, and it is also apparent that if this difficulty is encountered, the substitution of a tool of smaller diameter will not avoid the difficulty, as by such substitution the height of the cutting edge of the tool is different from that in which the original tool operated, and if the angle of the holder is increased in the attempt to overcome this difficulty, the depth of the possible boring operation is lessened.

It is a desideratum to produce a tool holder of such character that the substitution of a smaller or a larger tool shall not affect the alinement of the tool with the work, and shall not necessitate change in the position of the holder relative to the horizontal plane of the axis of the head stock, as required with holders having upwardly-facing tool seats. Accordingly I have provided a tool holder formed with laterally-facing tool seats; hence the cutting edges of different tools, regardless of size, will all occupy the same horizontal plane without changing the position of the holder itself.

Another object of the invention is to provide a tool holder equipped at its work-facing end with a laterally-facing rotatable turret provided in its lateral or vertical face with diametric grooves to accommodate tools of different diameter and shape, together with means for clamping a tool in the proper seat.

A further object is to provide a tool holder having a turret which can be clamped at any desired position of rotary adjustment with the tool horizontal, and an independent means for clamping a tool of any diameter against the vertical face of the turret, so that when the turret is once set at the desired point or level, it is only necessary to manipulate the tool clamping means when it is desired to substitute a tool of different size or form.

A still further object is to provide a tool holder equipped with a rotatably-adjustable turret whose axis is horizontal, and longitudinally adjustable means for clamping a tool diametrically across the turret, so that if the angular position of the holder is increased or lessened to accommodate a particular lathe, the turret carrying the tool initially in a horizontal position, can be rotated to return the tool to horizontal position but at a different height.

A tool holder of the character above outlined can be utilized to bore small holes of a length equal to the distance between the free end of the holder and the cutting edge of the tool, which distance obviously is limited only by the stiffness or rigidity of the tool itself. With the conventional tool holders the length of a small bore is limited if the height of the work is such that the tool seat of the holder is inclined upward or downward to dispose the cutting edge of the tool at the proper level.

With the above objects in view, the invention consists in certain novel and useful features of construction and combinations of parts as hereinafter described and claimed; and in order that it may be fully understood, reference is to be had to the accompanying drawing, in which:

Figure 1 is a side elevation of a tool post operatively carrying a tool holder and cutter embodying the invention.

Figure 2 is a top plan view of the tool holder and cutter.

Figure 3 is an end elevation of the tool holder with the cutter removed.

Figure 4 is a central vertical section through the device.

In the said drawing, where like reference characters identify corresponding parts in all of the figures, 1 indicates a tool post forming a part of a lathe (not shown) and 2 the shank of a tool holder which has been clamped by the screw 3 in the desired position of inclination on the rocker 4 for a certain character of work.

With conventional equipment, it frequently requires some manipulation of the parts to secure the inclination for the shank of the tool holder for the support of a tool in proper alinement with the work, especially in boring or threading operations. After the tool holder has been set for the work in hand, and one step in a series of operations has been performed, the operator of the lathe frequently desires to continue operations with a differently-shaped cutter. It then becomes necessary to adjust the tool holder relative to the work. In some cases this cannot be done. In other cases it can be done but considerable time is required to make the adjustment, and in such cases it is necessary to block up or put shims under the shank of the tool.

With the tool holder of the invention applied to any conventional lathe tool post, it is possible to substitute a smaller or larger tool or a tool of different character without disturbing the set of the tool holder in the post, and this is so because the seats for the tools extend diametrically of the axis of rotation of the part provided for carrying the tool and are formed in a vertical face of such part. It is also possible where the tool holder is adjusted to raise or lower the tool, to restore the tool to a horizontal position in longitudinal alinement with the work by rotatable adjustment of the carrying member.

To accomplish the adjustments referred to, the working end of the shank 2 terminates in a split clamping sleeve 5 whose axis is horizontal and transverse with respect to the longitudinal axis $a$—$b$ (Figure 1) of the lathe, it being possible to operate the sleeve to effect its clamping and unclamping actions by means of a cap screw 6 received within a tapped hole 7 in the tool holder shank, as illustrated.

The carrying member of the tool is in the form of a turret 8, disposed vertically and fitted flatwise against one side of the clamping sleeve, and provided at one side with a laterally-projecting cylindrical stem 9 fitting in but not projecting completely through said sleeve. The stem is tubular and the bore thereof is continued through the turret in enlarged form as shown at 10. The outer or working face of the turret is provided with a plurality of diametric grooves or tool seats 11 of different form and depth for the accommodation of tools of different shape and size, it being noted in this connection by referring particularly to Figure 4, that the clamping action of the sleeve upon the stem of the turret holds the latter against rotation.

To clamp a tool in a diametric groove of the turret and incidentally clamp the turret against the side of the sleeve to cooperate with the clamping action of the latter, and thus doubly guard against any possible rotatable shifting of the turret, the following mechanism is provided; 12 is a bolt capable of extending loosely through the turret, and said bolt is provided with a head 13 preferably of about the same diameter as the turret, the stem of the bolt adjacent the head being diametrically enlarged to fit in the enlarged part of the bore of the turret, and said enlarged portion of the stem is provided with an opening 14 to register with the particular diametric tool seat desired, said opening being of size to readily accommodate or receive the shank of a tool of maximum size.

To apply a tool 15, its shank is slipped through the diametric groove of the carrying member and the registering opening of the clamping bolt, and to draw said bolt toward the turret and thus cause the head of the bolt to clamp the tool rigidly in the turret seat, a washer 16 is fitted loosely on the stem of the bolt and bears against the opposite side of the split sleeve from the turret, and a nut 17 is screwed upon the bolt to apply clamping pressure on the washer and thus cause the same and the opposing side of the turret to clamp upon opposite sides of the clamping sleeve, and at the same time, as above stated, cause the head of the bolt to clamp the tool against the turret, and in this connection it is desirable to provide the central portion of the head of the bolt with a cavity or recess 18 in its inner face, so that the outer portions of said head shall constitute spaced jaws for clamping the tool at spaced points at opposite sides of the center of the bolt against the opposing portions or jaws as they may be termed, of the turret, and as it is preferred that the turret grooves for receiving round tool shanks shall be V-shaped, it will be seen that the round shank has a three-point clamping engagement with the head and turret at each side of the axis of the latter, which multiple clamping engagement holds the tool with the utmost rigidity against turning or slipping under the resistance offered by the work being done.

It will be apparent by reference to Figure 1 that the tool is shown as supported horizontally and in line with the axis of a rod 19 being operated upon, with such rod occupying a position co-axial with the axial line $a$—$b$ of the lathe, and it is clear by reference to this figure that an opening can be bored in the rod a depth corresponding to the length of the portion of the tool projecting to the left from the turret, and it will likewise be obvious that a tool of different diameter may be substituted for the one shown and operated at the same level without disturbing the set of the holder in the tool post. To make such change, nut 17 is unscrewed to unclamp the head 13 from the tool. The latter can then be withdrawn and a new tool substituted for it, and the new tool be clamped firmly in position by screwing the nut 17 properly upon the bolt 12.

If it is desired to raise the level of the cutting edge of the tool for some classes of work, it can be accomplished by loosening screw 3 and changing the angle of shank 2 of the tool holder through turning of the rocker 4, after which the operation of the screw 3 is reversed to secure the shank in its new position. If the character of work to be done is such that it cannot be accomplished with the tool disposed at an angle to the work, clamping screw 6 is manipulated to release the turret, and nut 17 is also turned back to remove the lateral grip of the turret on the sleeve. The turret can then be turned to dispose the tool horizontally, after which it is clamped rigidly in such position through the operation of screw 6 and nut 7. It will thus be seen that regardless of the angle of the shank of the tool holder, the tool can always be placed in a horizontal position, and that to accommodate differences in the distance between the horizontal planes of the line $a$—$b$ and the dotted line $c$ representing the seat of the rocker, a double adjustment must be made, that is, the angle of the tool holder shank must be such that the axis of the turret shall be in the plane $a$—$b$, after which the turret can be rotated to bring the cutting edge of the tool also in the plane of line $a$—$b$. The tool is thus lined properly with the work and hence a boring can be made for the full distance which the tool projects laterally from the turret, which of course cannot be accomplished if the tool slopes upwardly or downwardly from the turret except in the occasional circumstances mentioned where the diameter of the boring is relatively large, and as it is necessary frequently to bore passages of considerable length through small rods it is very desirable to provide a tool holder which will make such end attainable and yet is susceptible of use on lathes in which the distance between the planes $a$—$b$ and $c$ vary.

From the above description, it will be apparent that I have produced a tool holder embodying the features of advantage set forth as desirable in the statement of the objects of the invention, and which is susceptible of change in minor particulars without departing from the principle and mode of operation involved or from the spirit and scope of the appended claims.

I claim:

1. A tool holder comprising a shank, a tubular turret fitting laterally against a side of the shank and provided with a cylindrical stem fitting rotatably in the shank, a bolt extending horizontally through the turret and stem thereof and provided with a head at the opposite side of the turret from the shank and with an opening adjacent said head to receive a tool disposed diametrically of and fitting between the turret and the bolt head, and means fitted on the bolt and applying pressure against the opposite side of the shank from the turret to clamp the latter laterally against said shank and the tool firmly between the turret and the head of the bolt.

2. A tool holder comprising a shank, a tubular turret fitting laterally against a side of the shank and provided with a cylindrical stem fitting rotatably in the shank, a bolt extending horizontally through the turret and stem thereof and provided with a head at the opposite side of the turret from the shank and with an opening adjacent said head to receive a tool disposed diametrically of and fitting between the turret and the bolt head, means fitted on the bolt and applying pressure against the opposite side of the shank from the turret to clamp the latter laterally against said shank and the tool firmly between the turret and the head of the bolt, and means to circumferentially clamp the turret stem in the shank.

3. A tool holder comprising a shank, a tubular turret fitting laterally against a side of the shank and provided with a cylindrical stem fitting rotatably in the shank, a bolt extending horizontally through the turret and stem thereof and provided with a head at the opposite side of the turret from the shank and with an opening adjacent said head to receive a tool disposed diametrically of and fitting between the turret and the bolt head, a flanged washer fitted on the bolt and within the shank and having a flange against the side of the shank opposite from the turret, and a nut fitted on said bolt and applying pressure against the opposite side of the shank from the turret to clamp the latter laterally against said shank and the tool firmly between the turret and the head of the bolt, and means to circumferentially clamp the turret stem in the shank.

In testimony whereof I affix my signature.

JOHN F. RUSSELL.